United States Patent Office 3,730,882
Patented May 1, 1973

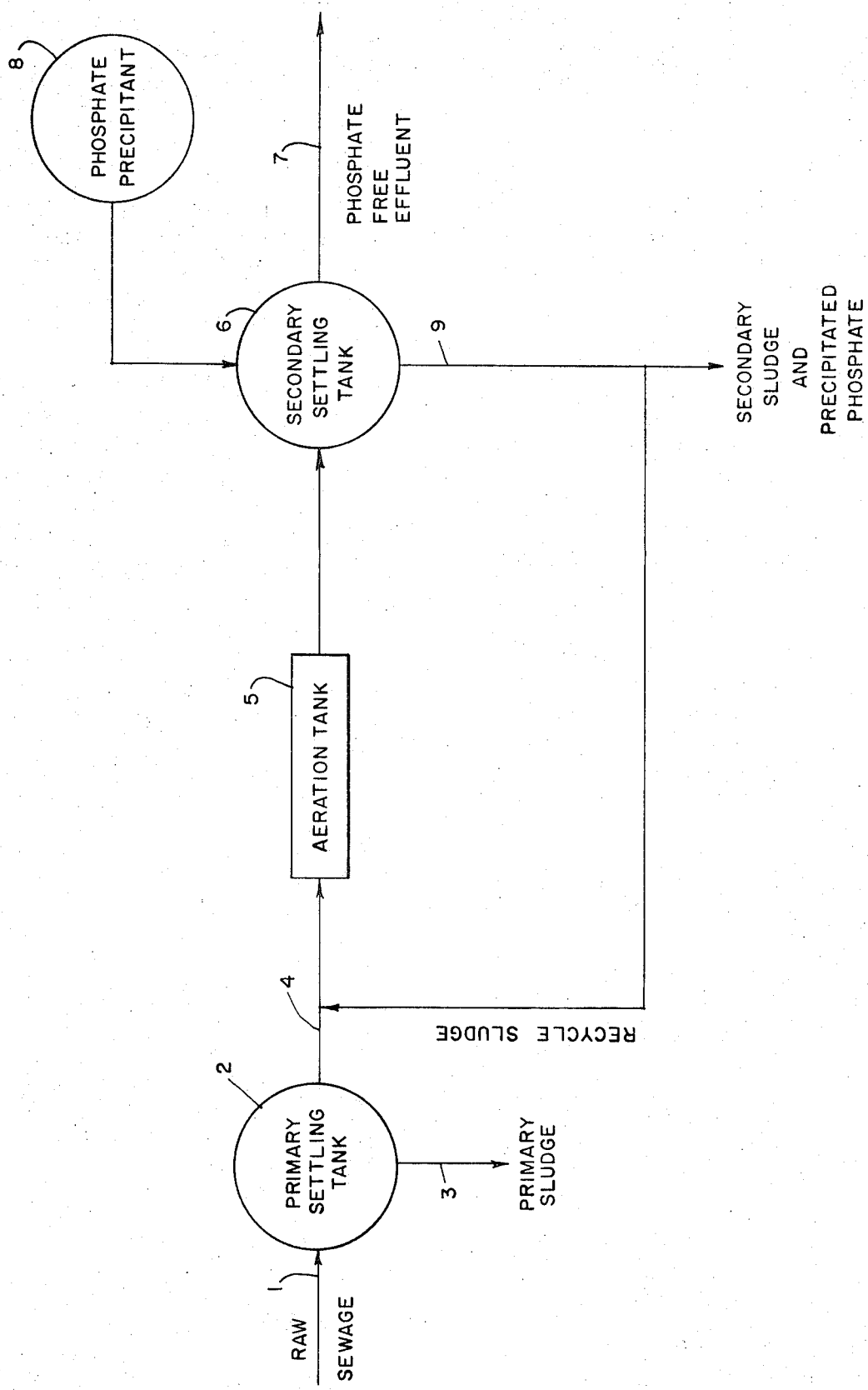

3,730,882
INTERNAL PRECIPITATION OF PHOSPHATE IN SETTLING ZONE
Gilbert V. Levin, Chevy Chase, and George J. Topol, Silver Spring, Md., assignors to Biospherics Incorporated, Rockville, Md.
Filed June 13, 1972, Ser. No. 262,190
Int. Cl. C02c 1/06
U.S. Cl. 210—6                                      6 Claims

ABSTRACT OF THE DISCLOSURE

There is disclosed an activated sludge sewage treatment process which comprises mixing influent sewage material with activated sludge to provide a mixed liquor. The mixed liquor is passed to an aeration zone wherein it is aerated to reduce the BOD content thereof and to cause the microorganisms present to take up phosphate. The mixed liquor is then passed to a settling zone containing an anaerobic layer of sludge. In the settling zone, phosphate-enriched sludge, in which the phosphate is present in the cells of the organisms, settles into the anaerobic layer of sludge and a substantially phosphate-free effluent is removed from above the layer of sludge. The sludge is maintained under anaerobic conditions in the sludge layer of the settling zone for a time sufficient to cause the organisms in the sludge to release phosphate to the liquid phase of the sludge. A phosphate precipitant is added to the sludge to precipitate the soluble phosphate in the phase thereof, resulting in a mixture of phosphate-depleted sludge and precipitated phosphate particles. This mixture is recycled for mixing with influent sewage material in the activated sludge sewage treatment process.

---

This invention relates to a process for treating raw or treated sewage to obtain a substantially phosphate-free effluent which is returned to natural water resources.

In the conventional activated sludge system in use today, sewage is subjected to the usual screening and preliminary sedimentation procedures, then mixed with activated sludge recycled from a settling tank to form a mixed liquor and the mixed liquor is subjected to aeration. During aeration of the mixed liquor, the organisms present cause the aerobic decomposition of solids and a high degree of BOD removal is achieved.

Phosphate, which are present in organic wastes and detergents, escape conventional sewage treatment processes and are released with the effluent into natural water resources, e.g., lakes, rivers and streams. These phosphates result in overfertilization or eutrophication of waters causing unsightly algal blooms and serious pollution problems.

It is known that aeration of the mixed liquor in an activated sludge sewage treatment process initially causes the microorganisms present to take up phosphate. U.S. Pat. No. 3,236,766 discloses a process which utilizes this phenomenon for removing phosphate from sewage. According to the process disclosed in that patent, the pH of raw sewage is adjusted, if necessary, to maintain a range of from about 6.2 to about 8.5, the sewage is mixed with activated sludge to form a mixed liquor, the mixed liquor is aerated to maintain a dissolved oxygen content of at least 0.3 mg. per liter in the mixed liquor and a phosphate-enriched sludge, in which the phosphate is present in the cells of the organisms, is separated from the mixed liquor in a settling zone to provide a substantially phosphate-free effluent. The phosphate-enriched sludge, in which the phosphate is still present in the cells of the organisms, is passed to a phosphate stripping and sludge thickening tank wherein it is treated to reduce the phosphate content thereof prior to recycling for mixing with the influent sewage. This is accomplished by maintaining the phosphate-enriched sludge in an anaerobic condition for several hours or at a pH of less than 6.5 for 10 to 20 minutes. The anaerobic condition and the acidic pH induce considerable quantities of introcellular phosphate to leak out of the sludge into a liquid phase.

It has also been suggested to combine a chemical phosphate precipitating treatment with biological phosphate removal in a sewage treatment process. Thus, U.S. Patent Nos. 3,409,545 and 3,386,911 disclose processes wherein raw sewage is first treated with lime to precipitate part of the phosphate content thereof. The effluent is then mixed with activated sludge and aerated so that the microorganisms metabolically consume phosphate content.

U.S. Pat. 3,480,144 discloses the addition of a phosphate precipitant directly to the aeration zone in an activated sludge sewage treatment process. Because of the high volume of material present in the aeration tank and the relatively low concentration of phosphate, a large excess of precipitant, e.g., approximately double the stoichiometric amount required, must be used.

Application Ser. No. 123,309 filed Mar. 11, 1971, entitled "Internal Precipitation of Phosphate From Activated Sludge" discloses an activated sludge sewage treatment process wherein influent sewage material is mixed with activated sludge containing precipitated phosphate particles to provide a mixed liquor. The mixed liquor is passed to an aeration zone wherein it is aerated to reduce the BOD content thereof and to cause the microorganisms present to take up soluble phosphate. The mixed liquor then passes to a secondary clarifier where the phosphate-enriched sludge, in which the phosphate is present in the cells of the organisms, is separated from the mixed liquor to provide a substantially phosphate-free effluent. The phosphate-enriched sludge is passed to a phosphate release zone where the microorganisms in the sludge are caused to release phosphate to the liquid phase. This is accomplished by holding the sludge under anaerobic conditions, by aerating the mixture or by appropriate pH adjustment, in a separate tank. A phosphate precipitant is added to the sludge to precipitate the water soluble phosphate content and the sludge containing the precipitated phosphate particles is recycled for mixing with influent sewage material.

It is an object of this invention to provide an improved process for reducing the phosphate content of sewage and for promoting a high degree of BOD removal in an activated sludge sewage treatment process.

It is another object of this invention to provide such a process which does not require the use of a separate phosphate stripping and sludge thickening tank.

These and other objects are attained by the practice of this invention which, briefly, comprises mixing influent sewage material with activated sludge to provide a mixed liquor. The mixed liquor is passed to an aeration zone wherein it is aerated to reduce the BOD content thereof and to cause the microorganisms present to take up phosphate. The mixed liquor is then passed to a settling zone containing an anaerobic layer of sludge. In the settling zone, phosphate-enriched sludge, in which the phosphate is present in the cells of the organisms, settles into the anaerobic layer of sludge and a substantially phosphate-free effluent is removed from above the layer of sludge. The sludge is maintained under anaerobic conditions in the sludge layer of the settling zone for a time sufficient to cause the organisms in the sludge to release phosphate to the liquid phase of the sludge. A phosphate precipitant is added to the sludge containing soluble phosphate in the liquod phase thereof to precipitate the water soluble phosphate content, resulting in a mixture of precipitated phosphate particles, sludge organisms that have given up intracellular phosphate and a phosphate-depleted aqueous phase. This mixture is recycled for mixing with influent sewage material.

The invention is illustrated in the accompanying drawing wherein the figure is a flow diagram of the phosphate removal process of this invention.

A raw sewage influent stream 1 is passed through conventional screening and grit removing units and is optionally subjected to primary settling in a primary settling tank 2 from which primary sludge is removed in line 3. The primary settled sewage is mixed with recycled, activated sludge and precipitated phosphate particles hereinafter described to form a mixed liquor and is passed by line 4 to the aeration tank 5.

In the aeration tank, the mixed liquor is aerated at a rate sufficient to maintain it aerobic—i.e., so that there is a measurable amount of dissolved oxygen present in the mixed liquor—in at least a part of the aeration tank for a period of 1 to 8 hours. During aeration, the bacteria present take up phosphate and consume organic matter present in the sewage. A high degree of BOD removal is obtained during aeration.

After aeration, the mixed liquor is fed into a secondary settling tank 6 containing a layer of sludge, the lower portion of which is anaerobic by virtue of the fact that the organisms have been detained in the zone long enough to consume all available oxygen. In the secondary settling tank 6, a mixture of phosphate enriched sludge and particles of phosphate precipitate settles and separates from the mixed liquor, leaving a substantially phosphate-free effluent which is discharged for disposal in a conventional manner by line 7. The phosphate-enriched sludge which separates and settles from the mixed liquor contains a high amount of phosphate present in the cells of the organisms in the sludge. The solid particles in the sludge containing intracellular phosphate as well as the particles of precipitated phosphate settle into the anaerobic layer of sludge in the secondary settling zone 6.

A density gradient exists in the layer of sludge in the settling tank 6, the density of the mixture of sludge and precipitated phosphate particles being greater at the bottom of the sludge layer. Because of the anaerobic conditions existing in this portion of the sludge layer, the organisms release phosphate to the liquid phase of the sludge in the form of water soluble phosphate ions. The concentration of soluble phosphate is greatest in the lower portion of the sludge layer.

The mixture of sludge and precipitated phosphate particles moves through the secondary settling tank in a plug flow pattern—i.e., the liquid and solids move through the tank progressively at substantially the same rate and the residence time in the tank is approximately the same. Preferably, the residence time of the mixture of sludge and precipitated phosphate particles in the tank is from 2 to 20 hours.

A phosphate precipitant, such as lime, is added from the source 8 to the secondary settling tank 6 in an amount sufficient to precipitate the soluble phosphate content of the sludge which comprises an aqueous phase containing soluble phosphate and a phosphate-depleted solids phase. This results in the production of more particles of precipitated phosphate. The phosphate precipitant is added so as to disperse through and achieve maximum contact with the soluble phosphate in the sludge layer and so that a substantial portion of it does not escape with the phosphate-free effluent in line 7. This may be accomplished by adding the precipitant to the lower portion of the sludge layer wherein the concentration of soluble phosphate is greatest. When the phosphate precipitant is added to the lower portion of the sludge layer, the density gradient existing in the sludge layer tends to prevent the phosphate precipitant from leaching out into the phosphate-free effluent.

A mixture of precipitated phosphate particles and a secondary sludge is continuously removed from the settling tank 6 by line 9. The sludge at this point is phosphate-depleted. A portion of the mixture, typically about 5%, may be delivered to waste and the remainder is recycled for mixing with the raw sewage or primary effluent which is being fed to the aeration tank 5.

Alternatively, the sludge containing soluble phosphate in the aqueous phase, the sludge organisms having released intracellular phosphate to this phase due to the anaerobic conditions, may be withdrawn from the settling tank 6 and the phosphate precipitant then added to the sludge. Thus, the phosphate precipitant may be added in line 9 or the sludge containing soluble phosphate in the aqueous phase may be passed to a separate reaction tank to which the aeration tank provide surface for the attachment and According to this invention, the insoluble precipitated phosphate is retained along with the activated sludge and is eventually removed from the system as waste secondary sludge. This is accomplished through conventional wasting procedures and does not require additional equipment. The phosphate releasing operation is conducted in the settling zone which immediately follows the aeration of the mixed liquor. Thus, the time and equipment required to withdraw sludge from this settling zone and send it to a separate phosphate stripping zone are elimenated.

In accordance with the practice of this invention, the particles of precipitated phosphate which are present in the aeration tank provides surface for the attachment and growth of microorganisms and also attract the nutrients and phosphate, making them available to the microorganisms. This enhances BOD reduction and the phosphate uptake of the microorganisms. Further, the presence of the precipitated phosphate improves the settling characteristics of the sludge in the secondary settling tank. Moreover, substantially all of the soluble phosphate is removed from the sludge rather than only the decantable portion, thus increasing the efficiency of the process and reducing the amount of aeration required to cause the microorganisms in the aeration tank to take up phosphate.

The following example illustrates a specific embodiment of this invention:

EXAMPLE

Raw sewage (1 million gallons per day—g.p.d.) containing 100 parts per million (p.p.m.) of solids is mixed with recycle activated sludge. The mixed liquor is fed to an aeration zone and is aerated at a rate of 2 cubic feet of air per gallon of sewage for six hours. The effluent mixed liquor from the aeration zone is fed to a secondary settling tank. Clarified waste liquor which is substantially free of phosphate is discharged to the effluent outflow after chlorination at a rate of 1 million g.p.d. The settled mixture of sludge, which is substantially anaerobic in the lower portion of the tank, contains a very low concentration of soluble phosphate at the top of the layer (about 1 part per million) and the concentration of soluble phosphate increases with the depth of the layer of about 50 parts per million at the bottom of the layer. The conditions existing in the lower part of this tank induce considerable quantities of intracellular phosphate to leak out to the liquid phase. A stoichiometric amount of alum required to precipitate the soluble phosphate present is added to the lower portion of the sludge layer causing the soluble phosphate present to precipitate. A mixture of sludge and precipitated phosphate is withdrawn from the secondary settling tank at a rate of 100,000 g.p.d. A portion (5,000 g.p.d.) is passed to waste sludge and the remainder is recycled for mixing with incoming raw sewage.

We claim:

1. An activated sludge sewage treatment process comprising mixing influent sewage material with sludge to provide a mixed liquor, aerating said mixed liquor for a time sufficient to reduce the BOD content and to cause the organisms present to take up phosphate, passing the mixed liquor to a settling zone containing an anaerobic layer of sludge, permitting the phosphate-enriched sludge portion of said mixed liquor to settle into the anaerobic layer of sludge wherein the anaerobic conditions in the sludge layer of said settling zone cause phosphate to be released to the liquid phase of said sludge in water soluble form, removing a phosphate-depleted supernatant from said zone, adding a phosphate precipitant to the sludge containing soluble phosphate in the liquid phase thereof to obtain a mixture of phosphate-depleted sludge and precipitated phosphate particles, recycling said mixture and mixing with said influent sewage material.

2. An activated sludge sewage treatment process as defined in claim 1 wherein said mixed liquor is aerated at a rate sufficient to maintain at least 0.3 mg. of dissolved oxygen per liter of mixed liquor.

3. An activated sludge sewage treatment process as defined in claim 2 wherein the said mixed liquor is aerated for a period of 1 to 8 hours.

4. An activated sludge sewage treatment process as defined in claim 1 wherein the residence time of the sludge in said settling zone is from 2 to 20 hours.

5. An activated sludge sewage treatment process as defined in claim 1 wherein said phosphate precipitant is added to said sludge at the lower portion of said sludge layer.

6. An activated sludge sewage treatment process as defined in claim 1 wherein said phosphate precipitant is added to said sludge after it has been removed from said zone.

References Cited

UNITED STATES PATENTS

| | | | |
|---|---|---|---|
| 3,235,487 | 2/1966 | Westgarth | 210—6 |
| 3,386,910 | 6/1968 | Forrest | 210—5 |
| 3,654,147 | 4/1972 | Levin et al. | 210—6 |
| 3,168,465 | 2/1965 | Kravs et al. | 210—7 |

OTHER REFERENCES

Keefer, C. F., et al., Activated Sludge Studies, Sewage and Ind. Wastes, August 1953, vol. 25, pp. 898–908 (P.O.S.L.).

Levin, G. V., et al., Metabolic Uptake of Phosphorus by Wastewater Organisms, Jour. WPCF., June 1965, Vol. 37, pp. 800–821 (P.O.S.L.).

MICHAEL ROGERS, Primary Examiner

U.S. Cl. X.R.

210—16, 18